United States Patent
Chou et al.

(10) Patent No.: US 11,611,475 B2
(45) Date of Patent: Mar. 21, 2023

(54) ASSOCIATION OF 3GPP (THIRD GENERATION PARTNERSHIP PROJECT) UPF (USER PLANE FUNCTION) AND EDGE COMPUTING APPLICATION SERVER

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 17/265,012

(22) PCT Filed: Jul. 31, 2019

(86) PCT No.: PCT/US2019/044339
§ 371 (c)(1),
(2) Date: Feb. 1, 2021

(87) PCT Pub. No.: WO2020/028490
PCT Pub. Date: Feb. 6, 2020

(65) Prior Publication Data
US 2021/0314220 A1     Oct. 7, 2021

Related U.S. Application Data

(60) Provisional application No. 62/713,980, filed on Aug. 2, 2018.

(51) Int. Cl.
| | | |
|---|---|---|
| H04L 41/0806 | (2022.01) | |
| H04L 41/022 | (2022.01) | |
| H04W 24/02 | (2009.01) | |

(52) U.S. Cl.
CPC ........ *H04L 41/0806* (2013.01); *H04L 41/022* (2013.01); *H04W 24/02* (2013.01)

(58) Field of Classification Search
CPC ... H04L 41/0806; H04L 41/022; H04W 24/02
See application file for complete search history.

(56) References Cited

U.S. PATENT DOCUMENTS

| | | | |
|---|---|---|---|
| 2018/0199240 A1 | 7/2018 | Dao et al. | |
| 2018/0317134 A1* | 11/2018 | Leroux | ............... H04L 41/0226 |
| 2018/0376444 A1* | 12/2018 | Kim | .................. H04W 74/0833 |
| 2019/0007500 A1* | 1/2019 | Kim | ..................... H04L 67/141 |

(Continued)

OTHER PUBLICATIONS

International Search Report dated Nov. 18, 2019 for International Application No. PCT/US2019/044339.

(Continued)

*Primary Examiner* — Duc C Ho
(74) *Attorney, Agent, or Firm* — Eschweiler & Potashnik, LLC (57) ABSTRACT

Techniques discussed herein can facilitate EC (Edge Computing) in connection with 5GC (Fifth Generation Core Network) system architecture. Various embodiments can facilitate one or more of: (1) providing the location of one or more UPFs (User Plane Functions) associated with at least one AS (Application Server) to a non-3GPP (Third Generation Partnership Project) EC management system; (2) providing the location of at least one AS associated with one or more UPFs to a 3GPP management system; and/or (3) establishing a relation between one or more UPFs and at least one AS.

20 Claims, 8 Drawing Sheets

(56) References Cited

U.S. PATENT DOCUMENTS

2019/0158985 A1* 5/2019 Dao ................. H04L 67/147
2019/0207778 A1* 7/2019 Qiao ................. H04W 4/24

OTHER PUBLICATIONS

3rd Generation Partnership Project; Technical Specification Group Services and System Aspects; System Architecture for the 5G System; Stage 2 (Release 15). 3GPP TS 23.501 V15.2.0 (Jun. 2018).

Kekki, Sami et al. "MEC in 5G networks." ETSI White Paper No. 28. First Edicition—Jun. 2018.

"Discussion on RAN support of edge computing in NR." Source: CMCC. Agenda Item: 10.2.10. 3GPP TSG-RAN WG2 Meeting #101, Athens, Greece, Feb. 26-Mar. 2, 2018. R2-1805533 resubmission of R2-1803210.

Husain, Syed et al. "Mobile Edge Computing with Network Resource Slicing for Internet-of-Things." 2018 IEEE 4th World Forum on Internet of Things (WF-IoT) Feb. 8, 2018.

3rd Generation Partnership Project; Technical Specification Group Services and System Aspects; Telecommunication management; Study on management aspects of edge computing (Release 16). 3GPP TR 28.803 V1.0.0 (May 2019).

International Preliminary Report on Patentability dated Feb. 11, 2021 for International Application No. PCT/US2019/044339.

\* cited by examiner

ASSOCIATION OF 3GPP (THIRD GENERATION PARTNERSHIP PROJECT) UPF (USER PLANE FUNCTION) AND EDGE COMPUTING APPLICATION SERVER

REFERENCE TO RELATED APPLICATIONS

This application is a National Phase entry application of International Patent Application No. PCT/US2019/044339 filed Jul. 31, 2019, which claims priority to U.S. Provisional Patent Application No. 62/713,980 filed Aug. 2, 2018, entitled "ASSOCIATION OF USER PLANE FUNCTION (UPF) AND EDGE COMPUTING APPLICATION SERVER", the contents of which are herein incorporated by reference in their entirety.

BACKGROUND

Fifth Generation (5G) networks are intended to support various new services such as Internet of Things (IoT), Cloud-based services, industrial control, autonomous driving, mission critical communications, and others, based on the network slicing technology. Some services, for example, autonomous driving, may have ultra-low latency and high data capacity targets, for example, due to safety and performance concerns. 5G Core Network (5GC) system architecture as defined in 3GPP (Third Generation Partnership Project) TS (Technical Specification) 23.501 supports edge computing to enable such services by applications that are hosted closer to the User Equipment's (UE's) access point of attachment in order to reduce the end-to-end latency and the load on the transport network.

DETAILED DESCRIPTION

Figure 1:
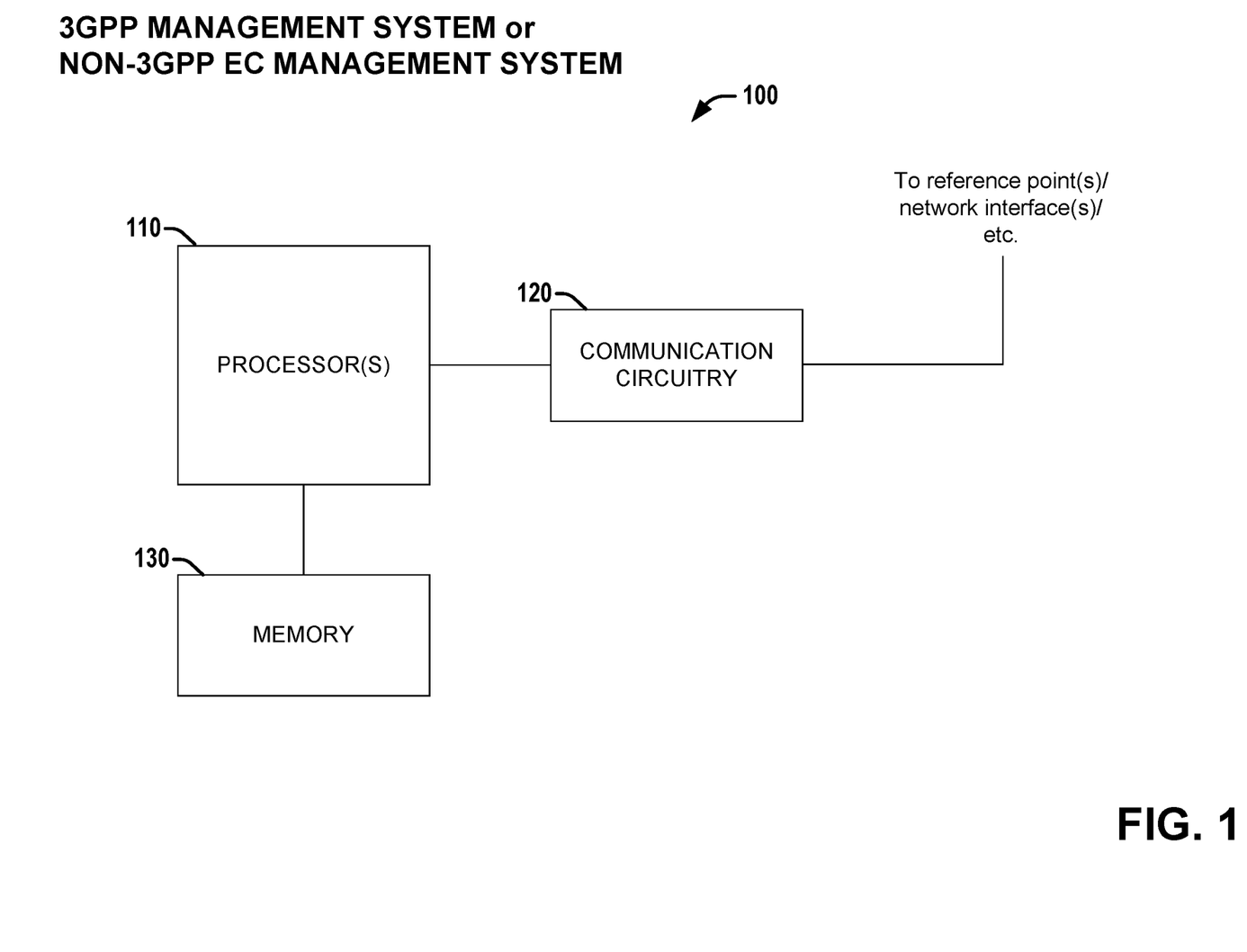
FIG. 1 is a block diagram illustrating a system employable at a 3GPP (Third Generation Partnership Project) management system or non-3GPP EC management system that facilitates relations between UPF(s) (User Plane Function(s)) and edge computing AS(s) (Application Server(s)) and the sharing of associated location information, according to various aspects discussed herein.

Embodiments described herein may be implemented into a system using any suitably configured hardware and/or software. Referring to FIG. 1, illustrated is a block diagram of a system 100 employable by a 3GPP (Third Generation Partnership Project) management system (e.g., as system $100_1$) or non-3GPP EC (Edge Computing) management system (e.g., as system $100_2$) that facilitates establishing relationships between UPF(s) (User Plane Function(s)) and edge computing AS(s) (Application Server(s)) and the sharing of associated location information, according to various aspects described herein. System 100 can comprise one or more processors 110 (e.g., each of which can comprise processing circuitry and one or more interfaces for send/receive data to/from each other or other circuitry, such as a memory interface to send/receive data to/from memory 130, a communication circuitry interface to send/receive data to/from communication circuitry 120, etc.), communication circuitry 120 (which can facilitate communication of data via one or more reference points, networks, etc., and can comprise communication resource(s), etc.), and memory 130 (which can comprise any of a variety of storage mediums and can store instructions and/or data associated with at least one of the one or more processors 110 or communication circuitry 120, and can comprise cache memory of processor(s) 110 and/or one or more memory/storage device(s), etc.). In some aspects, the one or more processors 110, the communication circuitry 120, and the memory 130 can be included in a single device, while in other aspects, they can be included in different devices, such as part of a distributed architecture. As described in greater detail below, system 200 can be employed by a 3GPP management system or non-3GPP EC management system to facilitate edge computing based on connecting UPF(s) and AS(s) and sharing their location information, in various embodiments.

Figure 2:
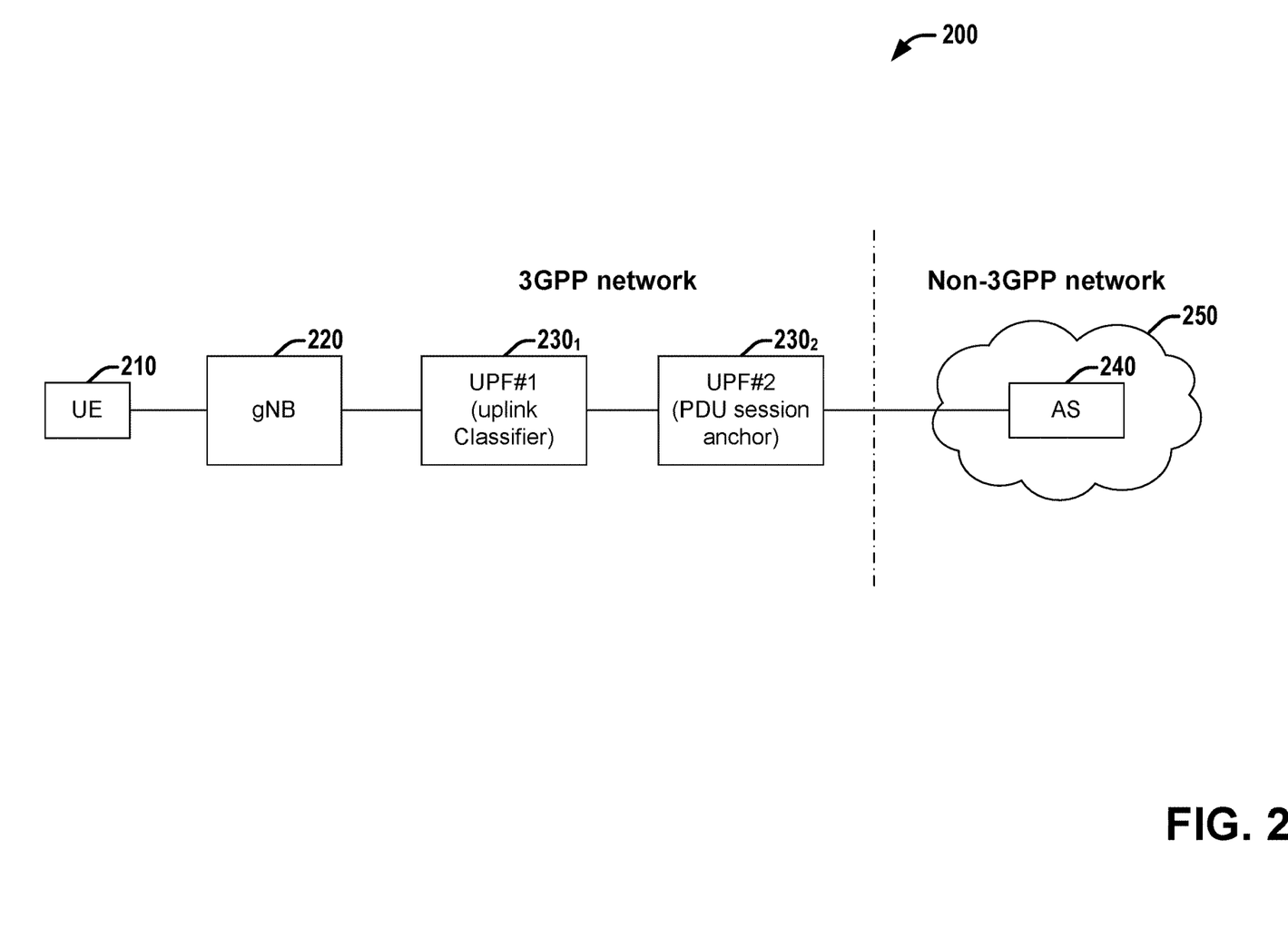
FIG. 2 is a diagram illustrating how a UE (User Equipment) is connected to a non-3GPP AS where an application is hosted, via the 3GPP network functions of the gNB (next generation Node B) and UPF(s), in connection with various aspects.

Referring to FIG. 2, illustrated is an example diagram 200 showing how a UE (User Equipment) 210 is connected to a non-3GPP AS (Application Server) 240 where an application is hosted (e.g., at a local data network 250), via the 3GPP network functions of the gNB (next generation Node B) 220 and UPF(s) (User Plane Function(s)) (Uplink Classifier $230_1$ and PDU (Protocol Data Unit) Session Anchor $230_2$ in example 200), in connection with various aspects discussed herein. The end-to-end latency between the UE and the AS can be reduced by having the UPF and AS be geographically close to each other.

Accordingly, various embodiments can address one or more of the following issues: (1) Providing a UPF location (if deployed) to an edge computing (EC) management system, such that the EC management system can deploy an AS in that location that can meet an end-to-end latency target (or a QoS (Quality of Service) requirement, etc.); (2) Providing an AS location (if deployed) to a 3GPP management system, such that the GPP management system can deploy UPF(s) in that location that can meet an end-to-end latency target; and (3) Providing relation(s) between UPF(s) and AS, wherein one or more UPFs can be connected to an AS (e.g., when a UE moves, e.g., from a first UPF (UPF #1) to a second UPF (UPF #2), the UPF to AS relation can indicate to which AS the UPF #2 is connected. If the AS is not the AS where the UE was previously connected, then it can redirect the UE traffic to the new AS).

Various embodiments can employ a 5G edge computing network architecture to facilitate non-3GPP edge computing functions (such as AF (Application Function), AS, etc.) interfacing with 3GPP network function(s). Example use cases and capabilities discussed below relate to the following three scenarios: (1) UPF location retrieval; (2) AS location retrieval; and (3) UPF to AS relation.

Edge Computing Concepts/Techniques

As discussed above, 5G networks are intended to support various new services such as IoT (Internet of Things), Cloud-based services, industrial control, autonomous driving, mission critical communications, and more, based on the network slicing technology. Some services, for example, autonomous driving, may have ultra-low latency and high data capacity targets, for example, due to safety and performance concerns. 5GC system architecture supports edge computing to enable such services by applications that are hosted closer to the UE's access point of attachment in order to reduce the end-to-end latency and the load on the transport network.

Figure 3:
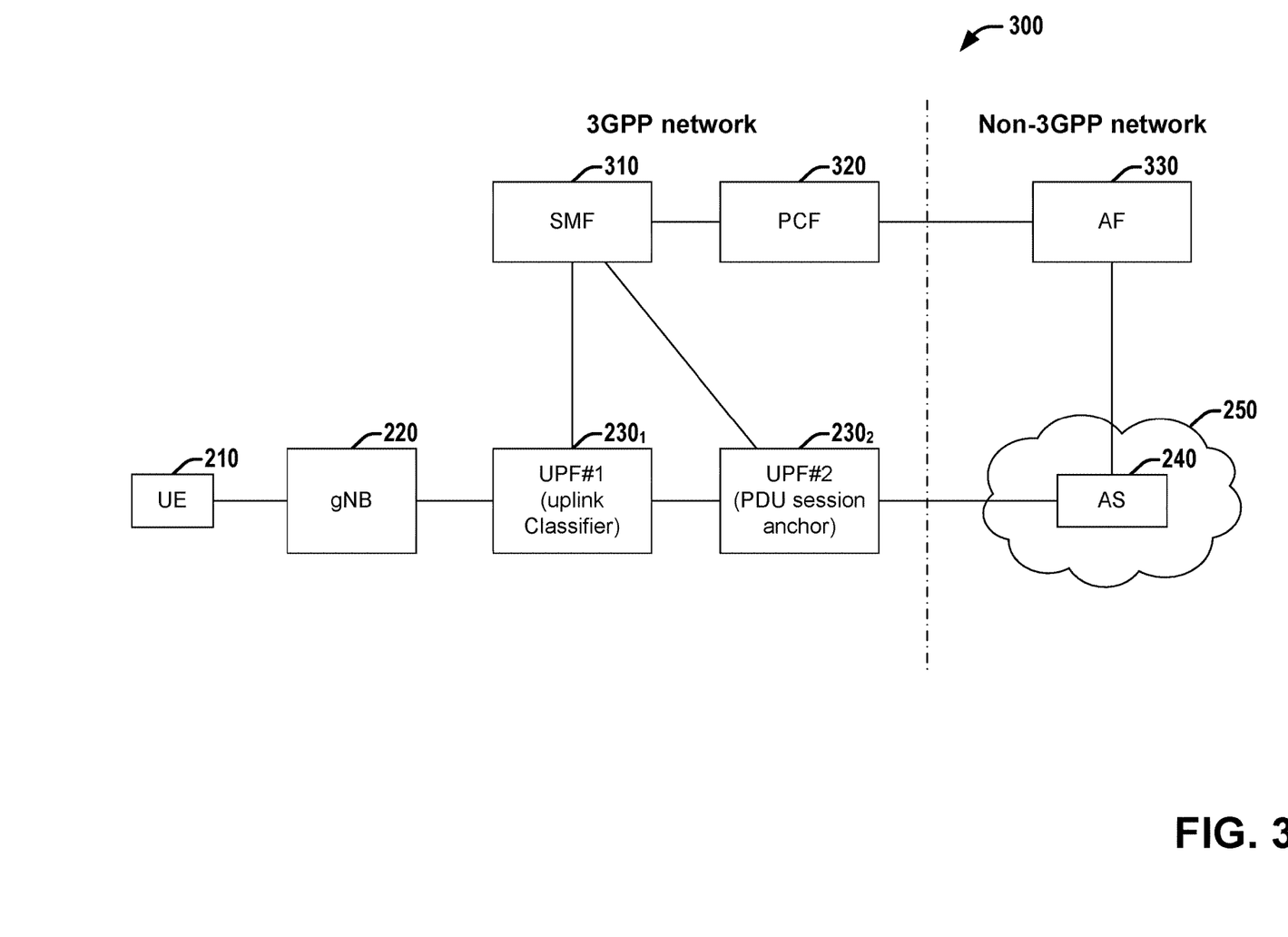
FIG. 3 is a diagram illustrating a 5G edge computing network architecture, showing how 3GPP network elements work with non-3GPP network elements such as AF and AS to provide services discussed herein, according to various embodiments.

Referring to FIG. 3, illustrated is a diagram of a 5G edge computing network architecture 300, showing how 3GPP network elements work with non-3GPP network elements such as AF (Application Function) and AS (Application Server) to provide EC services, according to various embodiments discussed herein. Elements 210-250 are similar to those discussed above in connection with FIG. 2. AF 330 can send requests to a SMF (Session Management Function) 310 via a PCF (Policy Control Function) 320 or a NEF (Network Exposure Function) (not shown) to influence UPF (User Plane Function) selection/reselection and/or traffic routing. The SMF 310 can insert an uplink classifier in a UPF (e.g., $230_1$, $230_2$, etc.) to divert some user plane traffic from the UE 210 to the local AS 240 to meet ultra-low latency targets imposed by the service.

The end-to-end latency of the traffic traveling from UE to AS includes the latency both inside and outside the 3GPP networks. The latency within the 3GPP networks is relevant to QoS (Quality of Service) target/goal/requirement in 5G networks, while the latency outside the 3GPP networks is related to the geographical locations of UPF and AS. Therefore, various embodiments can facilitate deployment of AS and UPF in a manner that meets the end-to-end latency targets of the services.

The deployment of edge computing in 3GPP networks can involve cooperation with other SDO(s) (Standard Defining Organization(s)), as AF and AS are not 3GPP defined nodes. Therefore, to support the edge computing deployment, the 3GPP management system can communicate with a non-3GPP edge computing (EC) management system, for example, as described in ETSI (European Telecommunications Standards Institute) GS (Group Specification) MEC (Multi-access Edge Computing) 003, or another non-3GPP EC management system.

Figure 4:
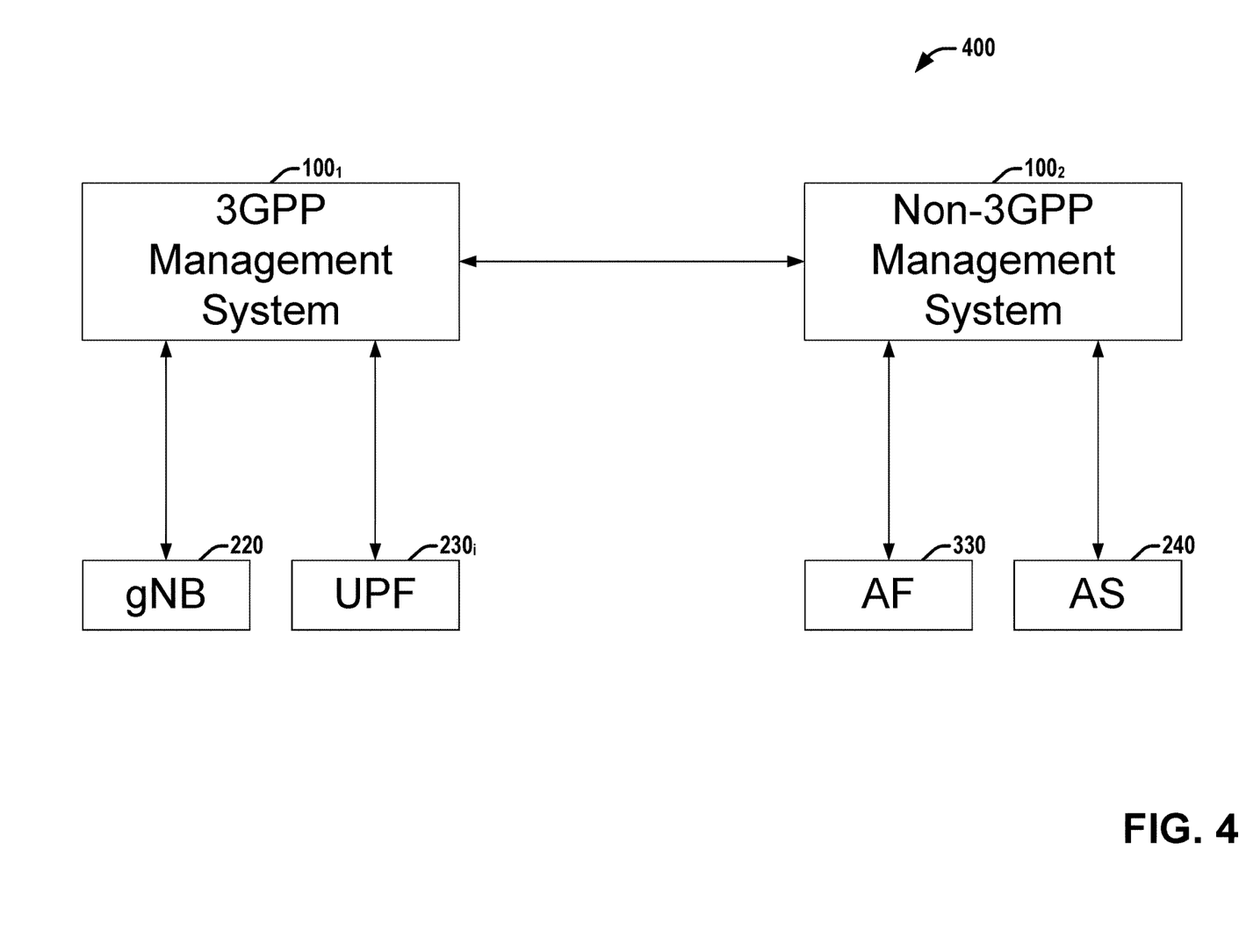
FIG. 4 is a diagram illustrating an example management architecture where a 3GPP management system and a non-3GPP EC management system can work together to support edge computing, according to various embodiments.

Referring to FIG. 4, illustrated is a diagram showing an example management architecture 400 where a 3GPP management system (e.g., employing a first apparatus $100_1$) and a non-3GPP EC management system (e.g., employing a second apparatus $100_2$) can work together to support edge computing, according to various embodiments.

The following are examples of use cases and conditions or characteristics of various embodiments and associated architectures.

EXAMPLE USE CASES

UPF Location Retrieval

Issues: An operator decides to deploy one or more AS(s) to support UPF(s) that have been deployed in 3GPP networks. Information about the UPF locations can facilitate operator determination of where the AS(s) should be deployed in order to meet the end-to-end target of the service.

Pre-conditions: The UPF(s) that are to connect to the AS(s) are deployed.

Figure 5:
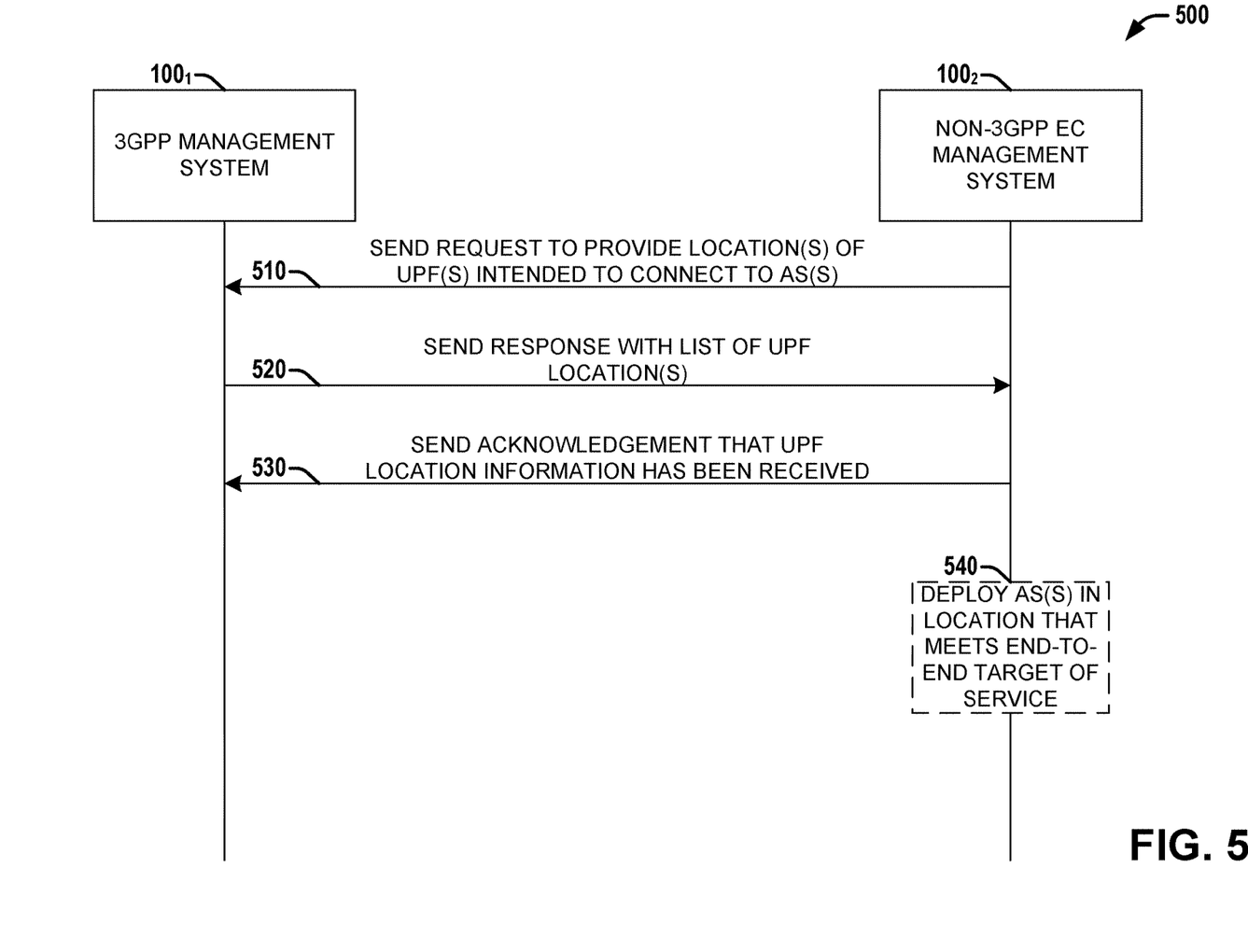
FIG. 5 is a flow diagram illustrating an example method employable by a 3GPP management system and a non-3GPP EC management system that facilitates provision of UPF location information associated with AS(s), in various aspects.

Description: Referring to FIG. 5, illustrated is a flow diagram of an example method 500 employable by a 3GPP management system (e.g., employing apparatus $100_1$) and a non-3GPP EC management system (e.g., employing apparatus $100_2$) that facilitates provision of UPF location information associated with AS(s), according to various aspects. Example method 500 illustrates a first method employable by a 3GPP management system to perform actions indicated in FIG. 5 and discussed below, and a separate second method employable at a non-3GPP EC management system to perform actions indicated in FIG. 5 and discussed below. In other aspects, machine readable medium can store instructions associated with either or both of these methods that, when executed, can cause the 3GPP management system and/or non-3GPP EC management system to perform acts of its associated method.

At 510, a non-3GPP EC management system can request to a 3GPP management system to provide the locations of UPF(s) that are intended to connect to the AS(s) (e.g., wherein signals from the non-3GPP EC management system to the 3GPP management system can be generated via processor(s) $110_2$, sent by communication circuitry $120_2$ over a relevant interface or reference point, received by communication circuitry $120_1$, and processed by processor(s) $110_1$). In various aspects, the request can indicate the locations of location of the AS(s) and/or data center(s)/local data network(s) hosting the AS(s).

At 520, the 3GPP management system can respond to the non-3GPP EC management system with a list of UPF location(s) (e.g., wherein signals from the 3GPP management system to the non-3GPP EC management system can be generated via processor(s) $110_1$, sent by communication circuitry $120_1$ over a relevant interface or reference point, received by communication circuitry $120_2$, and processed by processor(s) $110_2$).

At 530, the non-3GPP EC management system can acknowledge that the UPF location information has been received.

Post-conditions: At 540, the non-3GPP EC management can deploy the AS(s) in a location that meets the end-to-end target of the service.

AS Location Retrieval

Issues: An operator decides to add new UPF(s) to 5GC or change existing UPF(s) to connect to one or more AS(s) that have been deployed in non-3GPP networks. Information about the AS location(s) can facilitate operator determination of where the UPF(s) should be deployed in order to meet the end-to-end target of the service.

Pre-conditions: The AS(s) to which new UPF(s) are connected are deployed.

Figure 6:
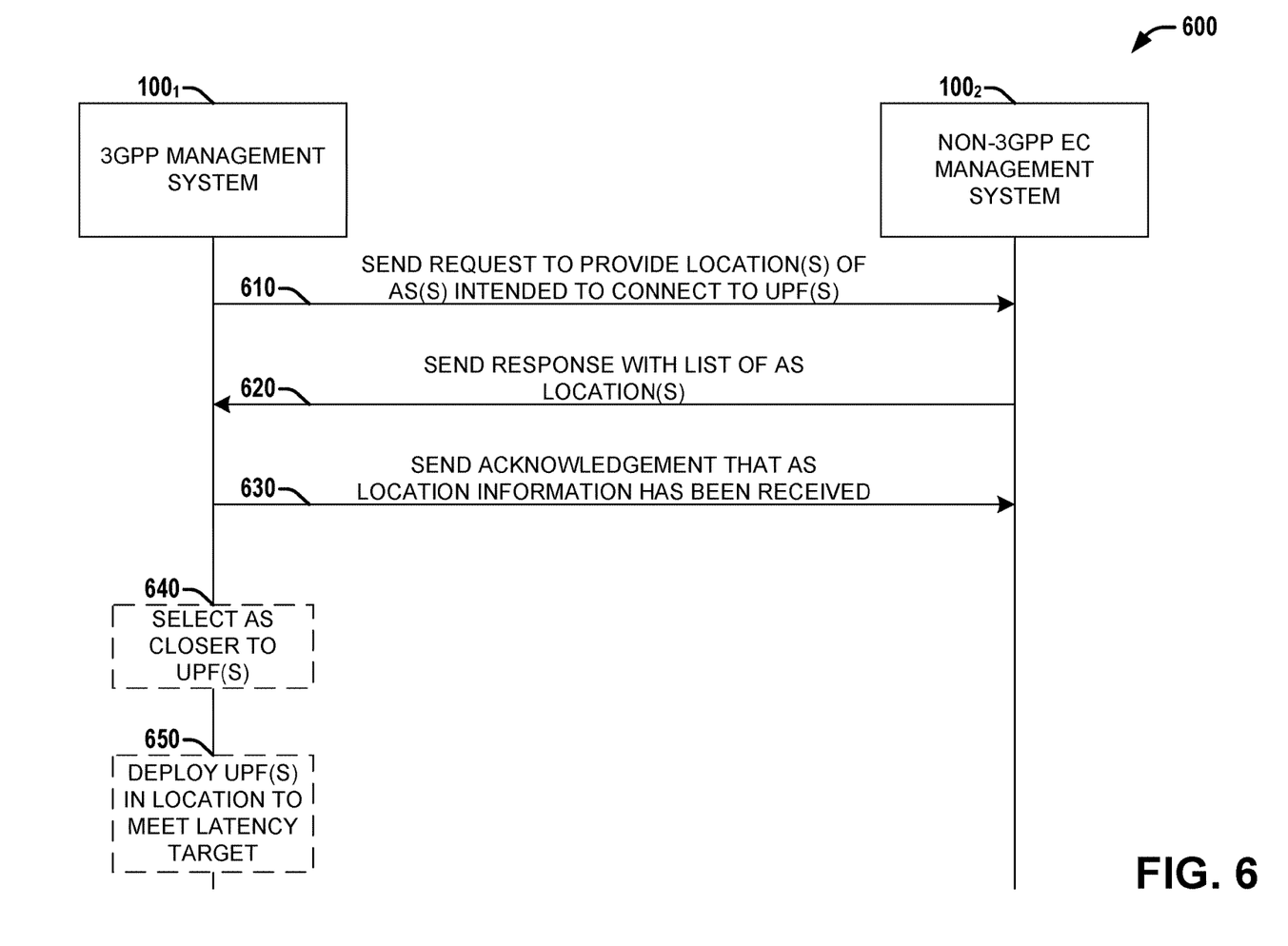
FIG. 6 is a flow diagram illustrating an example method employable by a 3GPP management system and a non-3GPP EC management system that facilitates provision of AS location information associated with UPF(s), in various aspects.

Description: Referring to FIG. 6, illustrated is a flow diagram of an example method employable by a 3GPP management system and a non-3GPP EC management system that facilitates provision of AS location information associated with one or more UPFs, in aspects. Example method 600 illustrates a first method employable by a 3GPP management system to perform actions indicated in FIG. 6 and discussed below, and a separate second method employable at a non-3GPP EC management system to perform actions indicated in FIG. 6 and discussed below. In other aspects, machine readable medium can store instructions associated with either or both of these methods that, when executed, can cause the 3GPP management system and/or non-3GPP EC management system to perform acts of its associated method.

At 610, a 3GPP management system can request a non-3GPP EC management system to provide the location of AS(s) to which the UPF(s) are to connect. In various aspects, the request can indicate the locations of location of the UPF(s) and/or data center(s) hosting the UPF(s).

At 620, the non-3GPP EC management system can respond to the 3GPP management system with the location(s) of AS(s).

At 630, the 3GPP management system can acknowledge that the AS location information has been received.

Post-conditions: At 640, the 3GPP management system can select the AS that is closer to the UPF(s), and at 650, the 3GPP management system can deploy the UPF(s) in the location where the AS to UE traffic latency meets the end-to-end latency target.

UPF to AS relation

Figure 7:
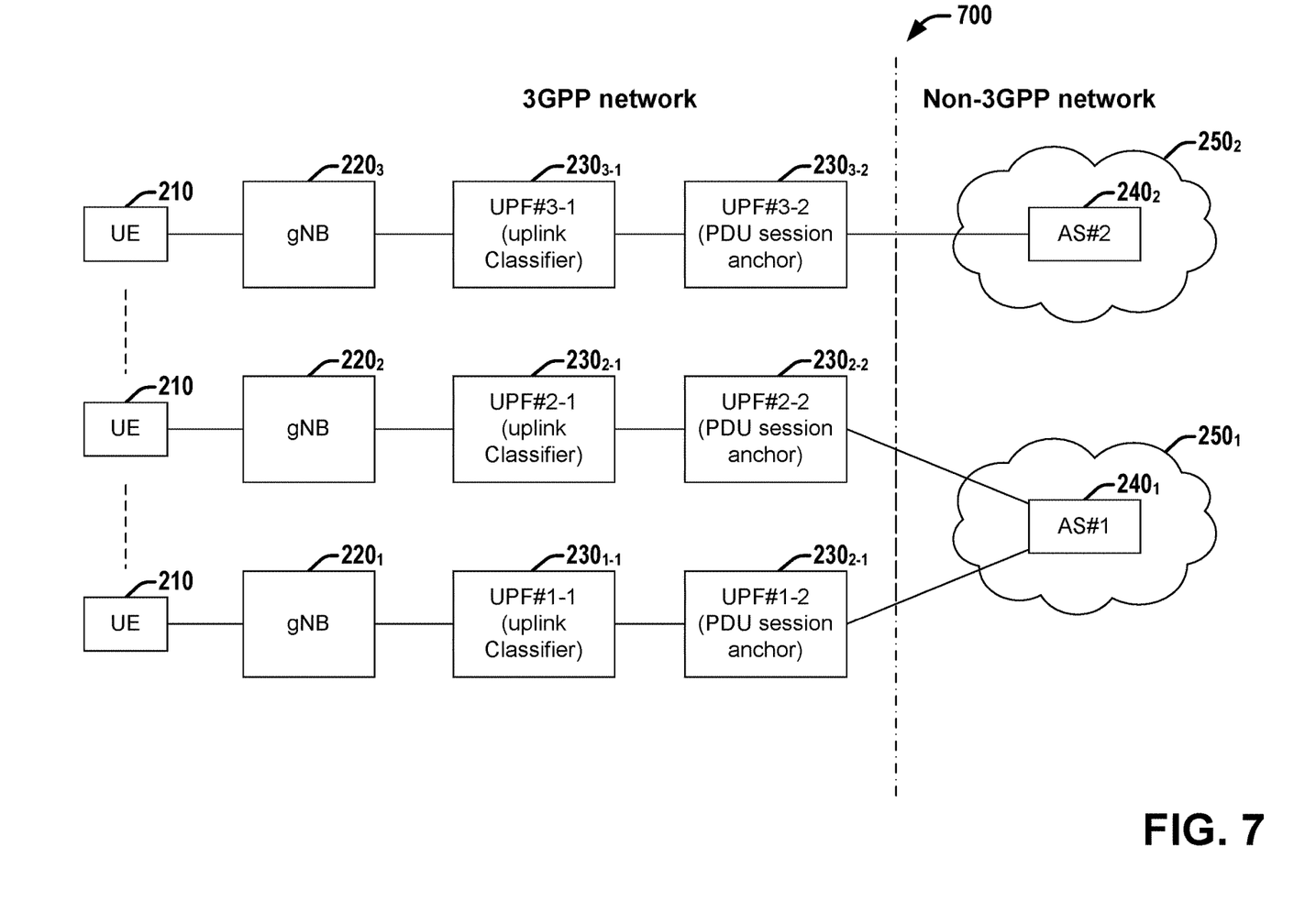
FIG. 7 is a diagram illustrating the UPF to AS relation for a scenario wherein one or more UPFs can be connected to an AS, according to various embodiments.

Issues: Referring to FIG. 7, illustrated is an example diagram 700 showing the UPF to AS relation for a scenario wherein one or more UPFs $230_{i\text{-}j}$ can be connected to an AS $240_i$ at an associated local data network $250_i$, in embodiments. As a UE 210 moves from a first gNB $220_1$ to a second gNB $220_2$ or third gNB $220_3$ that may be connected via UPFs $230_{i\text{-}j}$ to the same or different AS $240_1$ (hosted at a first local data network $250_1$) or $240_2$ (hosted at a second local data network $250_2$). If the target gNB $220_2$ or $220_3$ is connected to the AS $240_2$ that is different from the AS $240_1$ that the source gNB $220_1$ is connected, then the traffic from UE 210 can be redirected to the new AS $240_2$. Therefore, management of the UPF to AS relation can be facilitated by both the 3GPP management and non-3GPP EC management system.

Pre-conditions: The UPF(s) and AS have been deployed.

Figure 8:
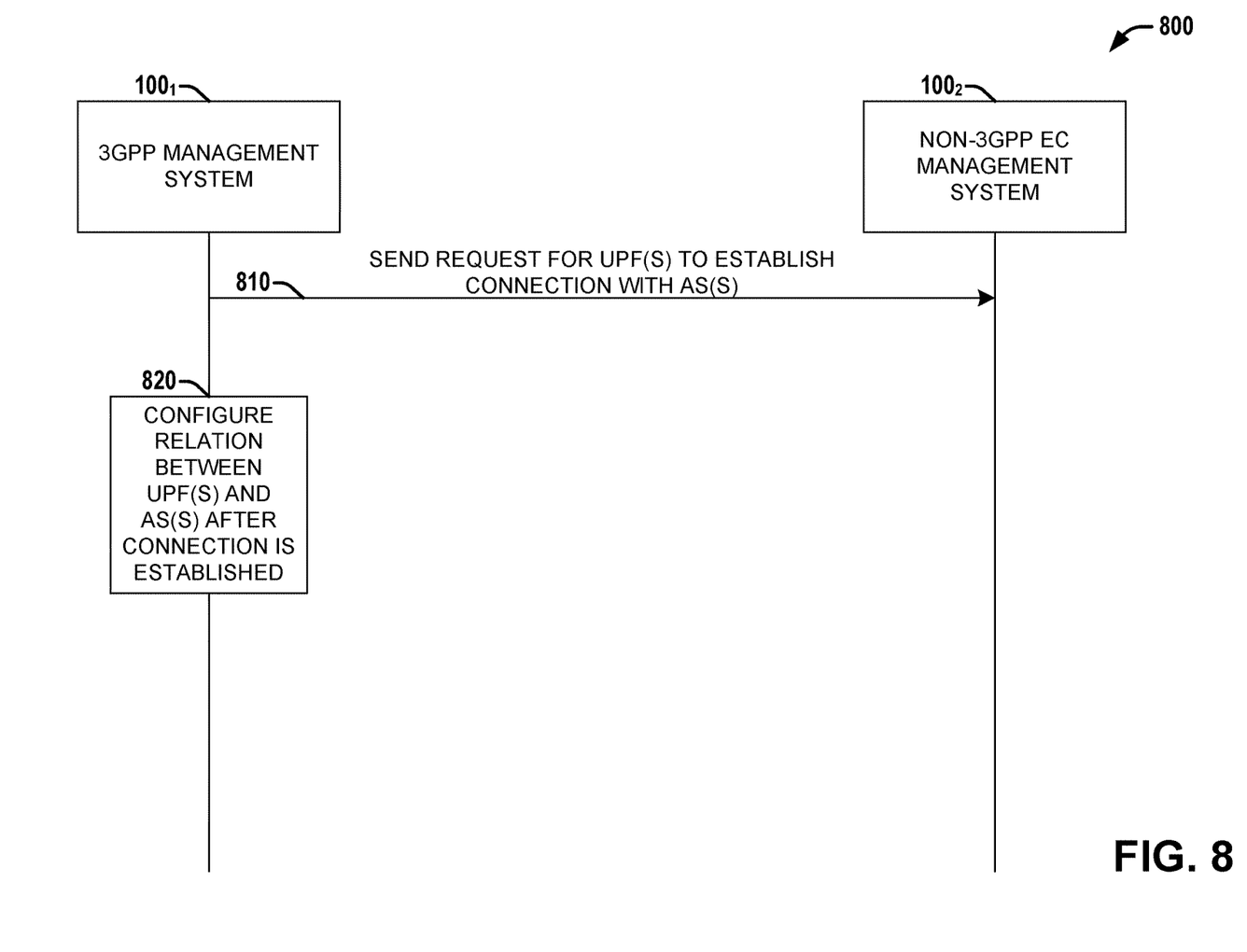
FIG. 8 is a flow diagram illustrating an example method employable by a 3GPP management system and a non-3GPP EC management system that facilitates configuration of a relation between one or more UPFs and one or more ASs, according to various aspects.

Description: Referring to FIG. 8, illustrated is a flow diagram of an example method employable by a 3GPP management system and a non-3GPP EC management system that facilitates configuration of a relation between one or more UPFs and one or more ASs, in aspects. Example method 800 illustrates a first method employable by a 3GPP management system to perform actions indicated in FIG. 8 and discussed below, and a separate second method employable at a non-3GPP EC management system to perform actions indicated in FIG. 8 and discussed below. In other aspects, machine readable medium can store instructions associated with either or both of these methods that, when executed, can cause the 3GPP management system and/or non-3GPP EC management system to perform acts of its associated method.

At 810, the 3GPP management system can request for one or more UPFs to establish connection(s) with one or more ASs. The connection establishment between UPF and AS can be facilitated via communication with a non-3GPP EC management system.

At 820, the 3GPP management system can configure the relation between the UPF(s) and AS(s), after the connection has been established.

Post-conditions: The UPF and AS relation is available for use.

Potential Conditions

The following are potential conditions or characteristics of systems employing embodiments discussed herein that can facilitate various embodiments discussed herein.

REQ-ECM_CON-1: The 3GPP management system should have a capability allowing non-3GPP EC management system to retrieve the UPF locations.

REQ-ECM_CON-2: The 3GPP management system should have a capability to request non-3GPP EC management system to provide the AS location.

REQ-ECM_CON-3: The 3GPP management system should have a capability to request the establishment of connection between UPF and AS.

REQ-ECM_CON-4: The 3GPP management system should have a capability to configure the relation between UPF and AS.

ADDITIONAL EMBODIMENTS

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a 3GPP (Third Generation Partnership Project) Management System, comprising: one or more processors configured to: receive a first request from an EC (Edge Computing) management system to provide information associated with one or more UPFs (User Plane Functions) to which EC resources in a local data network are to be connected; and provide the information associated with the one or more UPFs to the EC management system.

Example 2 comprises the subject matter of any variation of any of example(s) 1, wherein the information associated with the one or more UPFs comprises location information of the one or more UPFs.

Example 3 comprises the subject matter of any variation of any of example(s) 1-2, wherein the one or more processors are further configured to receive a first acknowledgment from the EC management system that the information associated with the one or more UPFs has been received.

Example 4 comprises the subject matter of any variation of any of example(s) 1-3, wherein the EC resources comprise at least one AS (Application Server).

Example 5 comprises the subject matter of any variation of any of example(s) 4, wherein the one or more processors are further configured to: send a second request to the EC management system to provide information associated with the at least one AS; and receive the information associated with the at least one AS from the EC management system.

Example 6 comprises the subject matter of any variation of any of example(s) 5, wherein the information associated with the at least one AS comprises location information of the at least one AS.

Example 7 comprises the subject matter of any variation of any of example(s) 5-6, wherein the one or more processors are further configured to send a second acknowledgment to the EC management system that the information associated with the at least one AS has been received.

Example 8 comprises the subject matter of any variation of any of example(s) 5-7, wherein the one or more processors are further configured to select a first AS of the at least one AS based on a latency target.

Example 9 comprises the subject matter of any variation of any of example(s) 8, wherein the one or more processors are further configured to deploy the one or more UPFs in a location close enough to the first AS to meet the latency target.

Example 10 comprises the subject matter of any variation of any of example(s) 1-9, wherein the EC management system is a non-3GPP EC management system.

Example 11 is an apparatus configured to be employed in an EC (Edge Computing) Management System, comprising: one or more processors configured to: send a request to a 3GPP management system to provide information associated with one or more UPFs (User Plane Functions) to which EC resources in a local data network are to be connected; and receive the information associated with the one or more UPFs from the 3GPP management system.

Example 12 comprises the subject matter of any variation of any of example(s) 11, wherein the information associated with the one or more UPFs comprises location information of the one or more UPFs.

Example 13 comprises the subject matter of any variation of any of example(s) 12, wherein the one or more processors are further configured to deploy at least one AS (Application Server) based on the location information of the one or more UPFs and a latency target.

Example 14 comprises the subject matter of any variation of any of example(s) 11-13, wherein the one or more processors are further configured to send a first acknowledgment to the 3GPP management system that the information associated with the one or more UPFs has been received.

Example 15 comprises the subject matter of any variation of any of example(s) 11-14, wherein the EC resources comprise at least one AS (Application Server).

Example 16 comprises the subject matter of any variation of any of example(s) 15, wherein the one or more processors are further configured to: receive a second request from the 3GPP management system to provide information associated with the at least one AS; and send the information associated with the at least one AS to the 3GPP management system.

Example 17 comprises the subject matter of any variation of any of example(s) 16, wherein the information associated with the at least one AS comprises location information of the at least one AS.

Example 18 comprises the subject matter of any variation of any of example(s) 16-17, wherein the one or more processors are further configured to receive a second acknowledgment from the 3GPP management system that the information associated with the at least one AS has been received.

Example 19 comprises the subject matter of any variation of any of example(s) 11-18, wherein the EC management system is a non-3GPP EC management system.

Example 20 is an apparatus configured to be employed in a 3GPP (Third Generation Partnership Project) Management System, comprising: one or more processors configured to: send a request to an EC (Edge Computing) management system to establish a connection between one or more UPFs (User Plane Functions) and at least one AS (Application Server).

Example 21 comprises the subject matter of any variation of any of example(s) 20, wherein the EC management system is a non-3GPP EC management system.

Example 22 comprises the subject matter of any variation of any of example(s) 20-21, wherein the one or more processors are further configured to configure a relation between the one or more UPFs and the at least one AS after the connection has been established.

Example 23 comprises the subject matter of any variation of any of example(s) 20-22, wherein the at least one AS is a single AS.

Example 24 comprises the subject matter of any variation of any of example(s) 20-23, wherein the one or more processors are further configured to redirect traffic from a first AS of the at least one AS to a different second AS of the at least one AS in response to a UE (User Equipment) associated with the one or more UPFs moving from a first gNB (next generation Node B) to a different second gNB.

Example 25 comprises the subject matter of any variation of any of example(s) 1-24, wherein the one or more UPFs comprise one or more of an uplink classifier or a PDU (Protocol Data Unit) session anchor.

Example 26 comprises an apparatus comprising means for executing any of the described operations of examples 1-25.

Example 27 comprises a machine readable medium that stores instructions for execution by a processor to perform any of the described operations of examples 1-25.

Example 28 comprises an apparatus comprising: a memory interface; and processing circuitry configured to: perform any of the described operations of examples 1-25.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a 3GPP (Third Generation Partnership Project) Management System, comprising:
one or more processors configured to:
receive a first request from an EC (Edge Computing) management system to provide information associated with one or more UPFs (User Plane Functions) to which EC resources in a local data network are to be connected, wherein the EC resources comprise at least one AS (Application Server);

provide the information associated with the one or more UPFs to the EC management system send a second request to the EC management system to provide information associated with the at least one AS; and receive the information associated with the at least one AS from the EC management system.

2. The apparatus of claim 1, wherein the information associated with the one or more UPFs comprises location information of the one or more UPFs.

3. The apparatus of claim 1, wherein the one or more processors are further configured to receive a first acknowledgment from the EC management system that the information associated with the one or more UPFs has been received.

4. The apparatus of claim 1, wherein the information associated with the at least one AS comprises location information of the at least one AS.

5. The apparatus of claim 1, wherein the one or more processors are further configured to send a second acknowledgment to the EC management system that the information associated with the at least one AS has been received.

6. The apparatus of claim 1, wherein the one or more processors are further configured to select a first AS of the at least one AS based on a latency target.

7. The apparatus of claim 6, wherein the one or more processors are further configured to deploy the one or more UPFs in a location close enough to the first AS to meet the latency target.

8. The apparatus of claim 1, wherein the EC management system is a non-3GPP EC management system.

9. An apparatus configured to be employed in an EC (Edge Computing) Management System, comprising:

one or more processors configured to:

send a request to a 3GPP management system to provide information associated with one or more UPFs (User Plane Functions) to which EC resources in a local data network are to be connected, wherein the information associated with the one or more UPFs comprises location information of the one or more UPFs;

receive the information associated with the one or more UPFs from the 3GPP management system; and deploy at least one AS (Application Server) based on the location information of the one or more UPFs and a latency target.

10. The apparatus of claim 9, wherein the one or more processors are further configured to send a first acknowledgment to the 3GPP management system that the information associated with the one or more UPFs has been received.

11. The apparatus of claim 9, wherein the one or more processors are further configured to:

receive a second request from the 3GPP management system to provide information associated with the at least one AS; and send the information associated with the at least one AS to the 3GPP management system.

12. The apparatus of claim 11, wherein the information associated with the at least one AS comprises location information of the at least one AS.

13. The apparatus of claim 11, wherein the one or more processors are further configured to receive a second acknowledgment from the 3GPP management system that the information associated with the at least one AS has been received.

14. The apparatus of claim 9, wherein the EC resources comprise at least one AS (Application Server).

15. The apparatus of claim 9, wherein the EC management system is a non-3GPP EC management system.

16. An apparatus configured to be employed in a 3GPP (Third Generation Partnership Project) Management System, comprising:

one or more processors configured to:

send a request to an EC (Edge Computing) management system to establish a connection between one or more UPFs (User Plane Functions) and at least one AS (Application Server); and redirect traffic from a first AS of the at least one AS to a different second AS of the at least one AS in response to a UE (User Equipment) associated with the one or more UPFs moving from a first gNB (next generation Node B) to a different second gNB.

17. The apparatus of claim 16, wherein the one or more processors are further configured to configure a relation between the one or more UPFs and the at least one AS after the connection has been established.

18. The apparatus of claim 16, wherein the one or more UPFs comprise one or more of an uplink classifier or a PDU (Protocol Data Unit) session anchor.

19. The apparatus of claim 16, wherein the EC management system is a non-3GPP EC management system.

20. The apparatus of claim 16, wherein the at least one AS is a single AS.

\* \* \* \* \*